(12) United States Patent
Höglund et al.

(10) Patent No.: US 10,746,064 B2
(45) Date of Patent: Aug. 18, 2020

(54) MULTI-WAY VALVE AS WELL AS ACTUATOR COMPRISING SUCH A MULTI-WAY VALVE

(71) Applicant: FREEVALVE AB, Ängelholm (SE)

(72) Inventors: Anders Höglund, Munka Ljungby (SE); Urban Carlson, Helsingborg (SE)

(73) Assignee: FREEVALVE AB, Ängelholm (SE)

( * ) Notice: Subject to any disclaimer, the term of this patent is extended or adjusted under 35 U.S.C. 154(b) by 0 days.

(21) Appl. No.: 16/336,946

(22) PCT Filed: Sep. 25, 2017

(86) PCT No.: PCT/SE2017/050923
§ 371 (c)(1),
(2) Date: Mar. 27, 2019

(87) PCT Pub. No.: WO2018/063055
PCT Pub. Date: Apr. 5, 2018

(65) Prior Publication Data
US 2019/0264586 A1 Aug. 29, 2019

(30) Foreign Application Priority Data
Sep. 28, 2016 (SE) ...................... 1651273

(51) Int. Cl.
*F16K 31/06* (2006.01)
*F01L 9/02* (2006.01)
(Continued)

(52) U.S. Cl.
CPC ............ *F01L 9/026* (2013.01); *F15B 13/044* (2013.01); *F16K 11/048* (2013.01);
(Continued)

(58) Field of Classification Search
CPC .... F16K 11/048; F16K 31/06; F16K 31/0637; F16K 11/24; F16K 31/0634;
(Continued)

(56) References Cited

U.S. PATENT DOCUMENTS 3,147,047 A * 9/1964 Fites ..................... B60T 15/046
303/52
3,169,804 A * 2/1965 Bueler .................... F16K 11/00
303/52
(Continued)

FOREIGN PATENT DOCUMENTS

DE 3621559 A1 1/1988
DE 8709320 U1 11/1988
DE 102005010693 A1 9/2006

OTHER PUBLICATIONS

International Search Report, dated Dec. 15, 2017 from corresponding PCT/SE2017/050923 application.
(Continued)

*Primary Examiner* — Matthew W Jellett
*Assistant Examiner* — Christopher D Ballman
(74) *Attorney, Agent, or Firm* — Young & Thompson (57) ABSTRACT

A multi-way valve includes a control pressure channel, first and second control fluid channels, a valve body in the first and second control fluid channels, and an electrically controlled device having a drive member and an armature. The armature moves back and forth by the drive member between inactive and active positions. Movement of the armature from the inactive to the active position displaces the valve body arrangement to an active position, closing the first and opening the second control fluid channel is open. The electrically controlled device includes a drive body connected to the armature and a first spring member between the armature and the drive body. The valve body arrangement is biased towards the inactive position by a second
(Continued)

spring member. The armature in the inactive position is biased towards the active position by a third spring member. Also disclosed is an actuator including the valve.

20 Claims, 6 Drawing Sheets (51) Int. Cl.
*F15B 13/044* (2006.01)
*F16K 11/048* (2006.01)
*F16K 11/056* (2006.01)
*F16K 31/00* (2006.01)
*F16K 31/08* (2006.01)
*F16K 11/24* (2006.01)

(52) U.S. Cl.
CPC .......... *F16K 11/056* (2013.01); *F16K 31/007* (2013.01); *F16K 31/0634* (2013.01); *F16K 31/0637* (2013.01); *F16K 31/082* (2013.01); F01L 2301/00 (2020.05); F01L 2820/01 (2013.01); F15B 2013/0448 (2013.01); *F16K 11/24* (2013.01); F16K 31/06 (2013.01)

(58) Field of Classification Search
CPC .... F16K 31/007; F16K 11/056; F16K 31/082; F15B 13/044
See application file for complete search history.

(56) References Cited

U.S. PATENT DOCUMENTS

| | | | | |
|---|---|---|---|---|
| 3,181,790 A * | 5/1965 | Smith | ...................... | F16K 11/24 236/12.22 |
| 3,463,443 A * | 8/1969 | Churchill | ................ | F16K 31/06 251/70 |
| 3,606,494 A * | 9/1971 | Frank et al. | .......... | B60T 15/046 303/52 |
| 3,799,203 A * | 3/1974 | Doutt | ..................... | F16K 11/048 137/625.65 |
| 3,823,736 A | 7/1974 | Vantil | | |
| 3,874,406 A * | 4/1975 | von Loewis of Menar | ................. | B60T 8/362 137/596.17 |
| 4,298,027 A | 11/1981 | Neff | | |
| 4,611,631 A | 9/1986 | Kosugi et al. | | |
| 4,641,405 A | 2/1987 | Green et al. | | |
| 4,817,669 A * | 4/1989 | Barrier | ................ | E21B 33/0355 137/236.1 |
| 4,886,091 A * | 12/1989 | Coleman | ................ | F15B 13/044 137/625.65 |
| 4,997,004 A * | 3/1991 | Barkhimer | ........... | F02M 47/027 137/596.17 |
| 5,375,625 A * | 12/1994 | Reynolds | ............ | F15B 13/0402 137/625.66 |
| 5,454,292 A * | 10/1995 | Oudelaar | ............... | B60J 7/1273 91/446 |
| 5,558,125 A * | 9/1996 | Sell | ........ | F16K 11/044 137/625.27 |
| 6,213,445 B1 * | 4/2001 | Sato | ...................... | F16K 11/105 137/909 |
| 6,450,198 B1 | 9/2002 | Bouteille et al. | | |
| 6,874,533 B2 * | 4/2005 | Weber | ................ | F15B 13/0405 137/596.17 |
| 7,533,687 B2 * | 5/2009 | Uemura | .............. | F04B 27/1804 137/375 |
| 8,413,685 B2 * | 4/2013 | Okamoto | ............ | F16K 31/0634 137/596.17 |
| 8,434,734 B2 * | 5/2013 | Birkelund | ............... | F16K 31/06 251/122 |
| 8,474,487 B2 * | 7/2013 | Ho | ........................ | F16K 11/044 137/625.27 |
| 9,388,912 B2 * | 7/2016 | Funakubo | ........... | F16K 31/0613 |
| 9,429,242 B2 * | 8/2016 | Becker | ................ | F16K 31/0634 |
| 9,791,055 B2 * | 10/2017 | Stucchi | ................. | F16K 31/008 |
| 9,822,900 B2 * | 11/2017 | Franconi | ............. | F16K 31/1225 |
| 10,267,283 B2 * | 4/2019 | Yasukawa | .......... | F02M 63/0075 |
| 2004/0118463 A1 * | 6/2004 | Yamamoto | ......... | G05D 16/2024 137/625.65 |
| 2004/0134547 A1 | 7/2004 | Moreno et al. | | |
| 2007/0131289 A1 | 6/2007 | Pataki | | |
| 2007/0193639 A1 | 8/2007 | Ling et al. | | |
| 2010/0107669 A1 * | 5/2010 | Wada | ...................... | F25B 41/04 62/196.1 |
| 2011/0209677 A1 * | 9/2011 | Kramer | ................... | F16K 31/06 123/90.12 |
| 2012/0222634 A1 * | 9/2012 | Dinkel | ................... | F16K 31/0631 123/90.12 |
| 2013/0327416 A1 * | 12/2013 | Passagot | ............... | F16K 11/056 137/15.21 |
| 2018/0252192 A1 * | 9/2018 | Sugaya | .............. | F02M 51/0685 |

OTHER PUBLICATIONS

Extended European Search Report issued in European Patent Application No. 17856904.2 dated May 8, 2020.

* cited by examiner

MULTI-WAY VALVE AS WELL AS ACTUATOR COMPRISING SUCH A MULTI-WAY VALVE

TECHNICAL FIELD OF THE INVENTION

The present invention relates in general to a multi-way valve that is configured to communicate at least one adjustable control pressure to a piece of equipment, a machine, an apparatus, etc. The present invention relates specifically to a multi-way valve for serving an actuator suitable for axial displacement of an object, such as a gas exchange valve of an internal combustion engine.

The inventive multi-way valve comprises a control pressure channel, a first control fluid channel extending between a first opening and said control pressure channel, a second control fluid channel extending between a second opening and said control pressure channel, a valve body arrangement arranged in said first control fluid channel and in said second control fluid channel, and an electrically controlled device having a drive member and an armature. The armature is displaceable back and forth under the effect of said drive member between an inactive position and an active position, wherein the multi-way valve is configured by means of the movement of the armature from the inactive position to the active position to displace the valve body arrangement from an inactive position where the first control fluid channel is open and the second control fluid channel is closed to an active position where the first control fluid channel is closed and the second control fluid channel is open, and the electrically controlled device further comprising a drive body connected to said armature and a first spring member arranged between the armature and said drive body.

According to a second aspect the present invention relates to an actuator for axial displacement of an object. The actuator is specifically suggested to be used as a gas exchange valve actuator for internal combustion engines, where the actuator drives one or more inlet valves or outlet valves which controls the supply and evacuation, respectively, of air relative to the cylinders of the internal combustion engine. Thus, the inventive actuator is especially suitable for driving engine valves and thereby eliminates the need for one or more cam shafts in the internal combustion engine.

BACKGROUND OF THE INVENTION AND PRIOR ART

Multi-way valves having a valve body arrangement that is displaced by means of an electrically controlled device are known for several applications. In a first state of the multi-way valve a first opening is in fluid communication with a control pressure channel and in a second state of the multi-way valve a second opening is in fluid communication with the control pressure channel. In this way alternation between two different control pressure levels is possible.

Reference may for instance be made to document US 2007/193639 disclosing such a multi-way valve having a valve body arrangement of slide valve type. However, this type of multi-way valve is not suitable in applications having high control fluid pressures, such as 20-25 Bar, due to unwanted leakage of control fluid past the valve body arrangement leading to unprecise levels of the control pressure driving/serving the equipment, machine, apparatus, etc.

An attempt to try to master the problem of leakage is disclosed in document DE 3621559 describing a multi-way valve having a valve body arrangement of seat valve type. A great disadvantage with known multi-way valves comprising valve body arrangements of seat valve type is that the entire mass of the armature of the solenoid and the valve body arrangement rebounds against the valve seat during a long period of time in connection with change of state, leading to unprecise change of state and draught/change of state leakage, which in its turn leads to unprecise levels of the control pressure driving/serving the equipment, machine, apparatus, etc.

U.S. Pat. No. 4,611,631 disclose a multi-way valve comprising a control pressure channel and two control fluid channels, a valve body driven by a drive unit, which comprises an armature and a drive member that is configured to displace the armature back and forth. The drive unit comprises a drive body connected to said armature and a spring member arranged between the armature and the drive body. A seal/guide member shall be arranged between the valve body and the drive body. This multi-way valve comprises a very large and heavy valve body that will take long time to stop after it has been displaced to the respective dead centres. The object of the drive body and the spring is solely to compensate for tolerance deviations between the length of stroke of the armature and the length of stroke of the valve body.

OBJECT OF THE INVENTION

The present invention aims at obviating the above-mentioned drawbacks and shortcomings of previously known multi-way valves suitable for serving an actuator for axial displacement of an object, and to provide an improved multi-way valve. A basic object of the invention is to provide an improved multi-way valve of the initially defined type, which has a distinct change of state of the valve body arrangement, which in its turn lead to increased precision of the equipment, machine, apparatus, etc., that the multi-way valve serve. A distinct change of state of the valve body arrangement entail an increased rebound frequency and decreased rebound duration time, in relation to prior art multi-way valves.

Another object of the present invention is to provide a multi-way valve, which entails that the valve body arrangement has a shorter length of stroke, which in its turn lead to a more compact design, and a faster and more distinct change of state as well as lower energy consumption of the electrically controlled device.

Another object of the present invention is to provide a multi-way valve that has lower tolerance demands regarding the valve body arrangement.

Another object of the present invention is to provide a multi-way valve having a longer useful life.

BRIEF DESCRIPTION OF THE INVENTION

According to the invention at least the basic object is achieved by way of initially defined multi-way valve and actuator, which have the features defined in the independent claims. Preferred embodiments of the present invention are further defined in the dependent claims.

According to a first aspect of the present invention a multi-way valve of the initially defined type is provided, which is characterized in that the valve body arrangement is biased in the direction towards the inactive position by means of a second spring member, and in that the armature when located in the inactive position is biased in the direction towards the active position by means of a third spring member, the first spring member exerting a greater spring force than the third spring member, and in that the second opening is configured to be connected to a control fluid source HP, and wherein the first opening is configured to be connected to a control fluid sink LP. According to a second aspect of the present invention an actuator suitable for axial displacement of an object is provided, which is characterized in that the actuator comprises an inventive multi-way valve.

Thus, the present invention is based on the insight that by decreasing the mass of the part, i.e. the armature and the valve body arrangement, that closes the first control fluid channel when the multi-way valve change from the inactive state to the active state, the change over time will be decreased proportionately. Thereto, the change over time when the multi-way valve changes from the active state to the inactive state will also decrease since mutual abutment among all movable parts of the multi-way valve is secured. Thus, the entire valve body arrangement and the armature will accelerate/move as one unit during the state change of the multi-way valve. According to a preferred embodiment of the present invention, an internal rubber damper is arranged at the interface between an internal brim of the armature and an internal stop surface arranged in the first control fluid channel, wherein said internal rubber damper is compressed between the internal brim and the internal stop surface when the armature is in the active position. This measure even further increase the ability of the multi-way valve to prevent rebounds of the valve body arrangement during state change of the multi-way valve.

According to a preferred embodiment of the present invention, the drive body is arranged in said first control fluid channel, the drive body being configured to abut the valve body arrangement and the first spring member being in a compressed state when the armature is located in the active position.

It is an advantage not to have intermediate elements between the drive body and the valve body. Intermediate elements increase the weight that shall be displaced and above all be quickly stopped after the displacement. Having the drive body arranged in the first control fluid channel entails that the drive member must not work against the pressure present in the first control fluid channel when the armature and the drive member shall be displaced.

According to a preferred embodiment of the present invention, the armature comprises in the free end thereof a cavity that accommodates said drive body and said spring member.

According to a preferred embodiment the valve body arrangement comprises a first valve body arranged in said first control fluid channel and a second valve body arranged in said second control fluid channel, wherein the multi-way valve is configured by means of the movement of the armature from the inactive position to the active position to displace the first valve body to an active position in which the first control fluid channel is closed and to displace the second valve body to an active position in which the second control fluid channel is open.

Further advantages of and features of the invention are evident from the other dependent claims and from the following detailed description of preferred embodiments.

BRIEF DESCRIPTION OF THE DRAWINGS

A more complete understanding of the abovementioned and other features and advantages of the present invention will be evident from the following detailed description of preferred embodiments with reference to the enclosed drawings, in which.

DETAILED DESCRIPTION OF PREFERRED EMBODIMENTS

The present invention relates to a multi-way valve, generally designated 1, suitable for serving an actuator 2 in order to provide an axial displacement of an object 3, as well as relates to an actuator 2 comprising such a multi-way valve 1.

Figure 1:
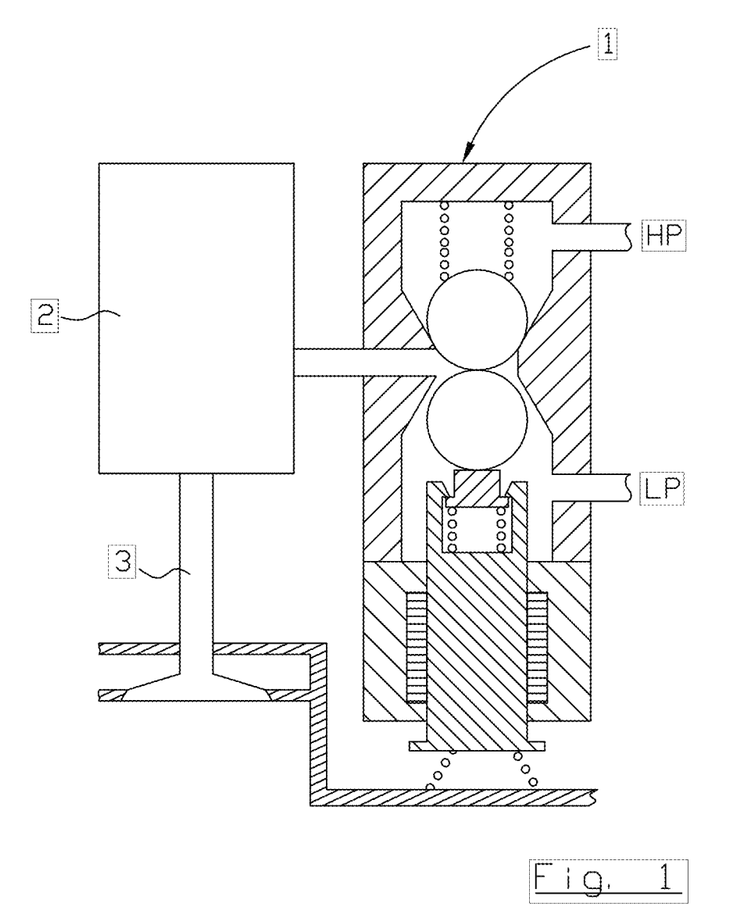
FIG. 1 is a schematic illustration of an inventive multi-way valve, an actuator and a gas exchange valve.

Reference is initially made to FIG. 1, which schematically discloses a first embodiment of the inventive multi-way valve 1, an actuator 2 and a gas exchange valve 3 of an internal combustion engine. It shall be pointed out that the mutual size of the units is not to scale. It shall also be pointed out that despite the multi-way valve 1 is drawn located outside the actuator 2, which is fully conceivable, still it is preferred to have the multi-way valve 1 located entirely or partly within the actuator 2.

The multi-way valve 1 is configured to communicate an adjustable control pressure to the actuator 2 (or to any other suitable equipment, machine, apparatus, etc.), whereupon the actuator 2 perform a displacement of the object 3 (for instance the engine valve). The multi-way valve 1 is also known under the name pilot valve. The actuator 2 is preferably a so-called pneumatic actuator driven by a gas or gas mixture.

The essential features of the multi-way valve 1 will now be described with reference to FIGS. 2 and 3 that disclose the first embodiment of the multi-way valve 1 in an inactive state and in an active state, respectively.

The multi-way valve 1 is electrically controlled and comprises a valve housing 4 and a control pressure channel 5 that extend from said valve housing 4 and that is configured to be connected to the actuator 2. The multi-way valve 1 is configured to communicate an adjustable control pressure (CP) via said control pressure channel 5. When the multi-way valve 1 is in a first state a first control pressure is communicated to the control pressure channel 5 and when the multi-way valve 1 is in a second state a second control pressure is communicated to the control pressure channel 5. Thereby an alternation between two different control pressure levels is obtained. By electrically controlled means that the multi-way valve 1 comprises an electrically controlled device, generally designated 6. The electrically controlled device is preferably constituted by an electromagnetic device, such as a solenoid, or an electromechanical device, such as a piezo electric unit. The electrically controlled device comprises a drive member 7 and an armature 8, the armature 8 being displaceable back and forth under the effect of said drive member 7 between an inactive position (FIG. 2) and an active position (FIG. 3). When the drive member 7 of the electrically controlled device 6 is not live (off) the armature 8 is located in the inactive position and when the drive member 7 is live (on) the armature 8 is displaced to the active position. In the embodiment of the electromagnetic device the drive member 7 is constituted by a coil and the armature 8 is displaceable in relation to said coil 7 under the effect of the magnetic field created when current is conducted through the coil. It shall be pointed out that the supply power level to the coil 7 of the electromagnetic device is adjustable in order to control the displacement of the armature 8. The armature 8 is thus manufactured from a magnetic material. In the embodiment of an electromechanical device (not disclosed) the drive member 7 is for instance constituted by a piezoelectric member and the armature 8 is displaceable by means of said piezoelectric member since it changed shape due to applied current and thereby mechanically displaces the armature 8. It shall be pointed out that the supply power level to the piezoelectric member of the electromechanical device is adjustable in order to control the displacement of the armature 8. Hereinbelow the multi-way valve will be described comprising an electromagnetic device 6, without being limited thereto.

The armature 8 according to the disclosed embodiment has an internal brim/flange 9a configured to abut an internal stop surface 10a when the armature 8 is located in the active position, and an external brim/flange 9b configured to abut an external stop surface 10b when the armature 8 is located in the active position, i.e. the multi-way valve 1 comprises a mechanical dead centre stop for the armature 8 in order to provide a well defined active position of the armature 8. It shall be pointed out that in an alternative embodiment the armature 8 only comprise one of the internal brim 9a and the external brim 9b, and thereto the multi-way valve 1 only comprise the corresponding stop surface. An internal rubber damper 11a is preferably arranged at the interface between the internal brim 9a of the armature 8 and the internal stop surface 10a, and an external rubber damper 11b is preferably arranged at the interface between the external brim 9b and the external stop surface 10b, in order to stop the armature 8 by preventing the armature 8 to rebound as well as minimizing noise and wear. The multi-way valve 1 further comprises a first control fluid channel 12, extending between a first opening 13 and said control pressure channel 5, a second control fluid channel 14, extending between a second opening 15 and said control pressure channel 5.

Preferably the first control fluid channel 12 is constituted by a control fluid outlet channel, and the first opening 13 is constituted by a control fluid outlet. The first opening 13 is configured to be connected to a pressure fluid sink (LP). Preferably the second control fluid channel 14 is constituted by a control fluid inlet channel, and the second opening 15 is constituted by a control fluid inlet. The second opening 15 is configured to be connected to a pressure fluid source (HP). The pressure fluid is preferably a gas or gas mixture, such as air.

The pressure fluid source (HP) may be a compressor that belongs to the internal combustion engine and with or without an associated tank, a separate compressor with or without an associated tank, or only a pressure tank. The pressure fluid sink may be any point with a lower pressure than the one generated in the pressure fluid source, for example a conduit leading back to the compressor, the pressure fluid sink (LP) has for example a pressure of 4-6 Bar, and the pressure fluid source (HP) has for example a pressure of 15-25 Bar.

The multi-way valve 1 comprises a valve body arrangement, generally designated 16, arranged in the valve housing 4, more precisely arranged in both the first control fluid channel 12 and the second control fluid channel 14. The expression arranged in said first control fluid channel 12 is meant that the valve body arrangement 16 is configured to control the flow of control fluid in the first control fluid channel 12 past the location of the valve body arrangement 16, i.e. arranged to open and close, respectively, the first control pressure channel 12. It shall be realized that the same also applies for the second control fluid channel 14. The valve body arrangement 16 is preferably manufactured from acid-proof steel, even thus other materials having higher as well as lower resistance against wear are conceivable.

The multi-way valve 1 is configured by means of the movement of the armature 8 from the inactive position to the active position to displace the valve body arrangement 16 to an active position where the first control fluid channel 12 is closed and the second control fluid channel 14 is open. Thus the first control fluid channel 12 is open and the second control fluid channel 14 is closed when the valve body arrangement 16 is located in its inactive position, and the first control fluid channel 12 is closed and the second control fluid channel 14 is open when the valve body arrangement 16 is located in its active position.

In the disclosed embodiment the valve body arrangement 16 is biased in the direction towards its inactive position, in which the second control fluid channel 14 is closed and the first control fluid channel 12 is open, by means of a second spring member 17. The second spring member 17 is preferably constituted by a helical spring. However, it is conceivable that when the multi-way valve 1 is oriented as disclosed in the figures the valve body arrangement 16 takes its inactive position due to gravity.

The electrically controlled device 6 comprises a drive body 18 connected to said armature 8 and a first spring member 19 arranged between the armature 8 and said drive body 18. The drive body 18 is configured to abut the valve body arrangement 16 and the spring member 19 is in a compressed state when the armature 8 is located in the active position. The drive body 18 is arranged in the first control fluid channel 12. The first spring member 19 admit mutual axial displacement between the drive body 18 and the armature 8, at the same time as the drive body 18 is biased in the direction away from the armature 8 and towards the valve body arrangement 16.

It is essential for the present invention that the armature 8 when located in the inactive position is biased in the direction towards the active position, and towards the valve body arrangement 16, by means of a third spring member 20. Thereto, the spring force exerted by the first spring member 19 shall be greater than the spring force exerted by the third spring member 20. Thereby the drive body 18 abuts the valve body arrangement 16 without displacing the valve body arrangement 16 in the direction towards its active position. Preferably, the third spring member 20 is preloaded when the armature 8 is located in the active position. Preferably, the third spring member 20 is a helical spring, more preferably a conical helical spring in order to obtain a minimum axial height when fully compressed. In real, the third spring member 20 is more compressed than is disclosed in the drawings when the armature 8 is in the inactive position. In the disclosed embodiments the spring force exerted by the second spring member 17 is greater than the spring force exerted by the third spring member 20. Thereto, the spring force exerted by the first spring member 19 is greater than the spring force exerted by the second spring member 17.

When the armature 8 is located in the inactive position the first spring member 19 is expanded in relation to the compressed state when the armature 8 is located in the active position, however it is not necessary that the first spring member 19 is expanded to an entirely unloaded state. The first spring member 19 is preferably constituted by a helical spring. According to the most preferable embodiment the first spring member 19 is biased/preloaded when the armature 8 is in the inactive position and the first spring member 19 is in expanded state. The degree of bias/preload shall preferably by high enough to start to displace the valve body arrangement 16 directly upon activation of the drive member 7 without having the first spring member 19 compressed, and when the valve body arrangement 16 takes its active position the first spring member 19 starts to compress. In other words, the armature 8 and the drive body 18 have the effect of a "solid" unit when the valve body arrangement 16 is under displacement from the inactive position to the active position, and when the valve body arrangement 16 takes the active position the drive body 18 is disconnected from the armature 8 and the first spring member 19 is compressed. When the valve body arrangement 16, driven by the drive body 18, reaches the active position in which the first control fluid channel 12 is closed the armature 8 continues a further distance, until the external brim 9b of the armature 8 abut directly or indirectly the external stop surface 10b and/or the internal brim 9a of the armature 8 abut directly or indirectly the internal stop surface 10a, whereupon the first spring member 19 is tighten/compressed. The armature 8 shall not abut the valve body arrangement 16, and the first spring member 19 shall not bottom, i.e. become fully compressed.

Due to the mass of the drive body 18 being much less than the mass of the armature 8, preferably less than ⅓₀, most preferably less than ¹⁄₄₀, the time it takes for the drive body 18 and the valve body arrangement 16 to settle, i.e. when the valve body arrangement 16 is standing still in the active position and the first control fluid channel 12 is closed, is significantly reduced. Thus, by using the drive body 18 and the first spring member 19 to drive the valve body arrangement 16 instead of having the armature 8 acting directly against the valve body arrangement 16, the time from the first rebound to standing still is decreased in proportion to the weight relationship between the drive body 18 and the armature 8.

The time from first rebound to standing still, based on the present invention and the weight relationships mentioned above, is in the range ¹⁄₅₀-¹⁄₃₀ of the time from first rebound to standing still in an application having the same armature 8 acting directly against the valve body arrangement 16. Thereto the height of rebound/amplitude will be significantly reduced, based on the present invention and the weight relationships mentioned above, having a height of rebound in the range ¹⁄₁₀-⅕ of the height of rebound in an application having the same armature 8 acting directly against the valve body arrangement 16. Thereto the rebound frequency is significantly increased. All together entails a distinct change of state and the change of state leakage will in this context become negligible or entirely eliminated, and thereby no perceivable negative effects will be generated in the control pressure channel 5.

In connection with the multi-way valve 1 is about to change from the active stat to the inactive state the following will happen. When the electrically controlled device 6 is deactivated, i.e. the power to the drive member 7 is switched off, the armature 8 will start its displacement from the active position to the inactive position. During the acceleration of the armature 8 from stand still, and the effect of the drive member 8 dies away, the drive body 18 keeps the valve body arrangement 16 in the active position during the expansion of the first spring member 19. At the time the drive body 18 starts its displacement from the active position to the inactive position, the armature 8 has gained a significant speed that entails that the acceleration of the drive body 18 from stand still is much higher than the initial acceleration of the armature 8. This entails in its turn that the valve body arrangement 16 is admitted to return from the active position to the inactive position much quicker. Thus, a distinct change of state and the change of state leakage will in this context become negligible or entirely eliminated, and thereby no perceivable negative effects will be generated in the control pressure channel 5.

Figure 2:
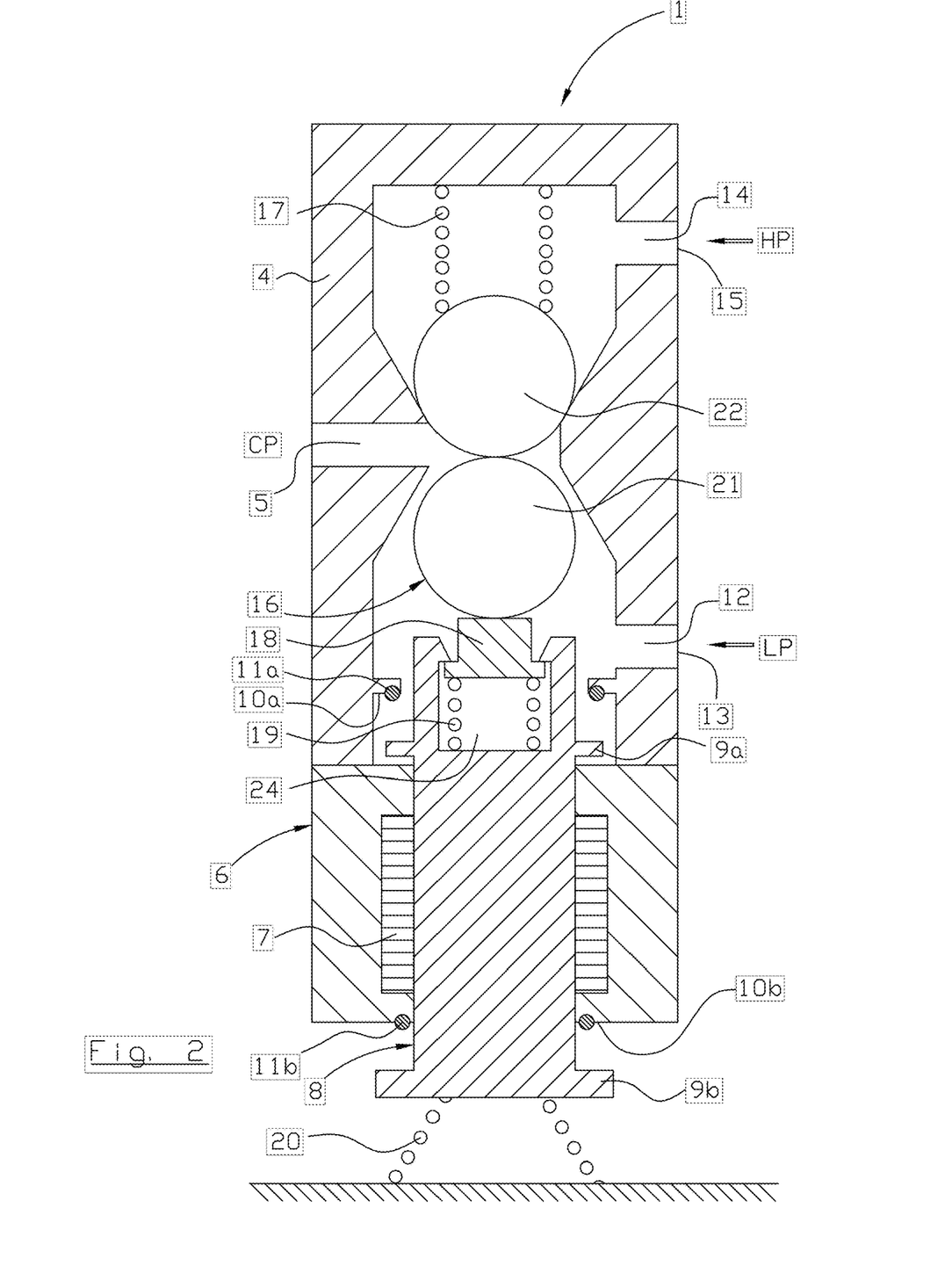
FIG. 2 is a schematic illustration of a multi-way valve according to a first embodiment, where the multi-way valve is in the inactive state.
Figure 3:
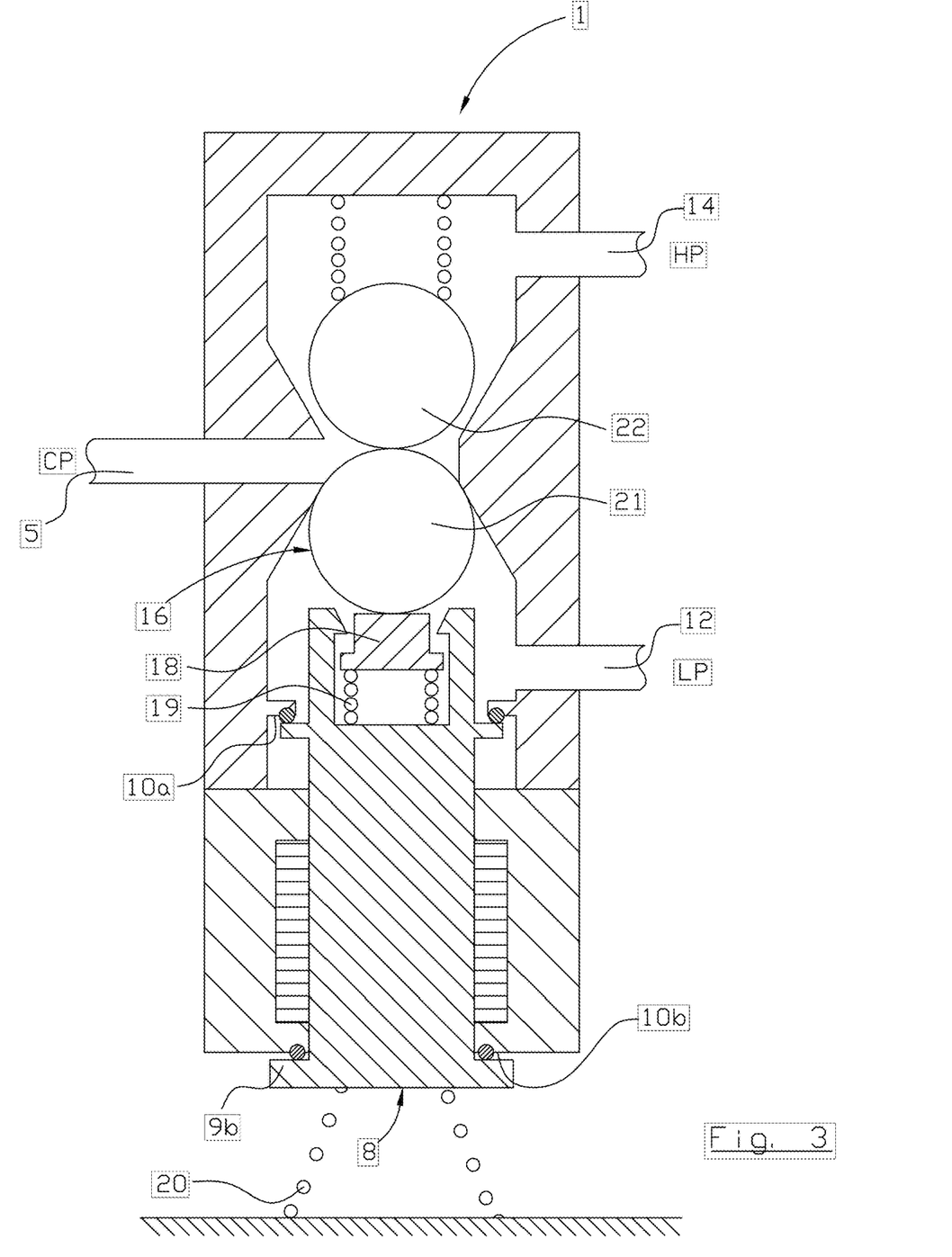
FIG. 3 is a schematic illustration of the multi-way valve according to FIG. 2, where the multi-way valve is in the active state.

According to a preferred embodiment, as is disclosed in FIGS. 2 and 3, the valve body arrangement 16 comprises a first valve body 21 arranged in said first control fluid channel 12 and a second valve body 22 arranged in said second control fluid channel 14. Said first valve body 21 is in the disclose embodiment separated from said second valve body 22. The multi-way valve 1 is thereby configured by means of the movement of the armature 8 from the inactive position to the active position to displace the first valve body 21 to an active position where the first control fluid channel 12 is closed and to displace the second valve body 22 to an active position where the second control fluid channel 14 is open. More precisely the drive body 18 acts against the first valve body 21 that in its turn acts against the second valve body 22. In this embodiment, where the valve body arrangement 16 is constituted by two mutually disconnected valve bodies 21 and 22, respectively.

Preferably the first valve body 21 and the second valve body 22, respectively, are spherical. According to an alternative embodiment the first valve body 21 and/or the second valve body 22 may present a truncated cone shape. According to another alternative embodiment the first valve body 21 and/or the second valve body 22 may present oblong basic shape having semi spherical ends, like a piece of rod having rounded ends. The advantage of having spherical valve bodies is that they are allowed to turn freely in all directions and in practice a spherical body takes a new position each time the valve body contacts its corresponding seat. This entails that the valve body as well as the seat will be loaded evenly and will wear evenly. Spherical valve bodies of very high quality are relatively cheap to manufacture in relation to non-spherical valve bodies.

Figure 4:
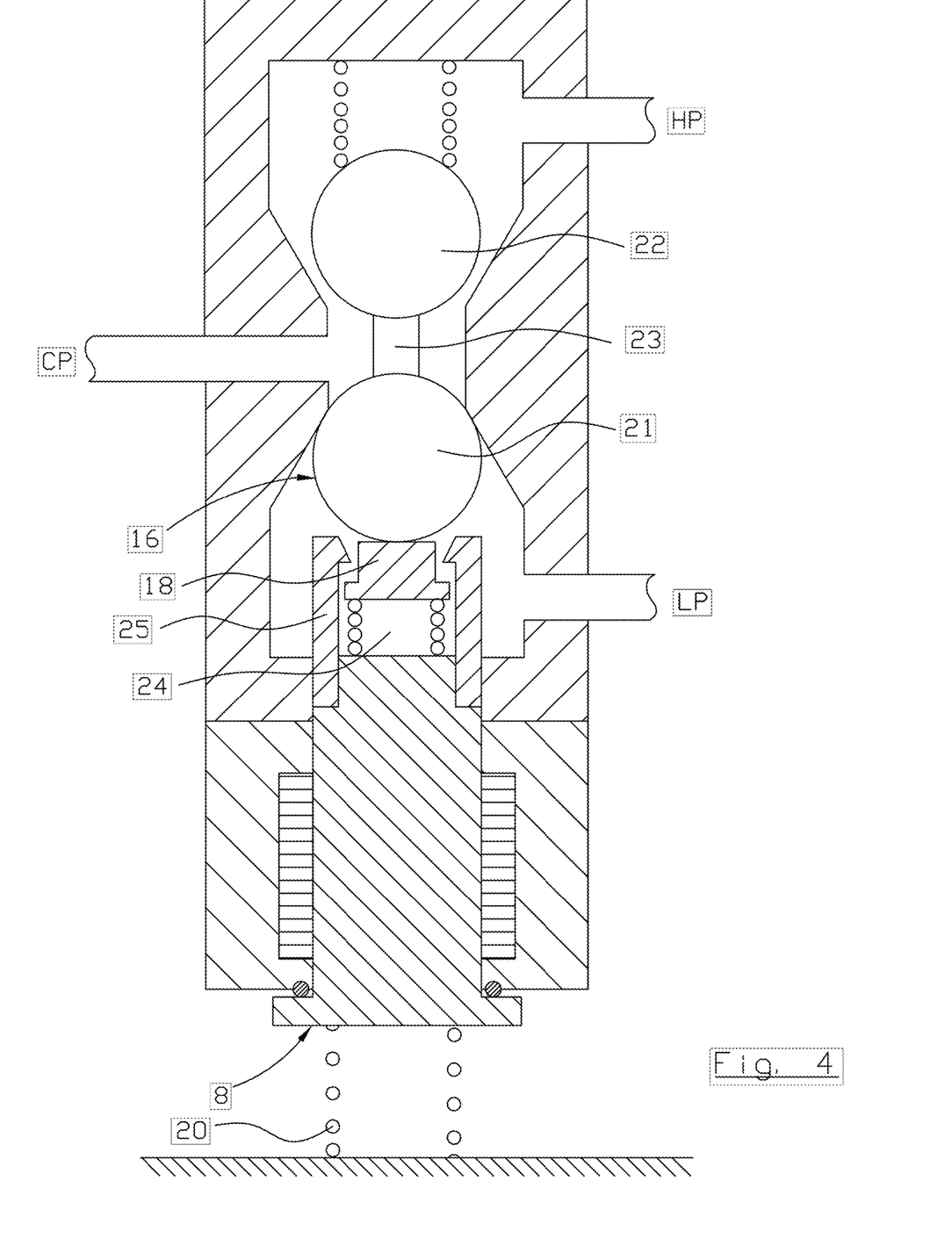
FIG. 4 is a schematic illustration of a multi-way valve according to a second embodiment, where the multi-way valve is in the active state.

Reference is now made to FIG. 4 that disclose a second embodiment of the multi-way valve 1. Only differences in relation to the other embodiments will be described.

In this embodiment the valve body arrangement 16 is constituted by a combined member. The first valve body 21 and the second valve body 22 of the valve body arrangement 16 are connected to and jointly displaceable with each other. In a non-disclosed embodiment the first valve body 21 and the second valve body 22 are connected directly to each other, like an eight. In the embodiment disclosed in FIG. 4 the first valve body 21 and the second valve body 22 are connected indirectly to each other by means of an intermediate rod 23, like a dumbbell. In these embodiments, in which the valve body arrangement 16 is constituted by an integrated body, it is preferred that the drive body 18 abuts the valve body arrangement 16 when the armature 8 is located in the inactive position.

Preferably the armature 8 comprises in the free end thereof a cavity 24 housing the drive body 18 and the first spring member 19. The cavity 24 may for instance be a boring in the armature 8, as is disclosed in FIGS. 2 and 3, or be provided by means of a sleeve 25 that is attached to and forms part of the armature 8, as is disclosed in FIG. 4. The cavity 24 is designed in such a way that the drive body 18 is kept in the cavity 24 when the armature 8 is in the inactive position.

Figure 5:
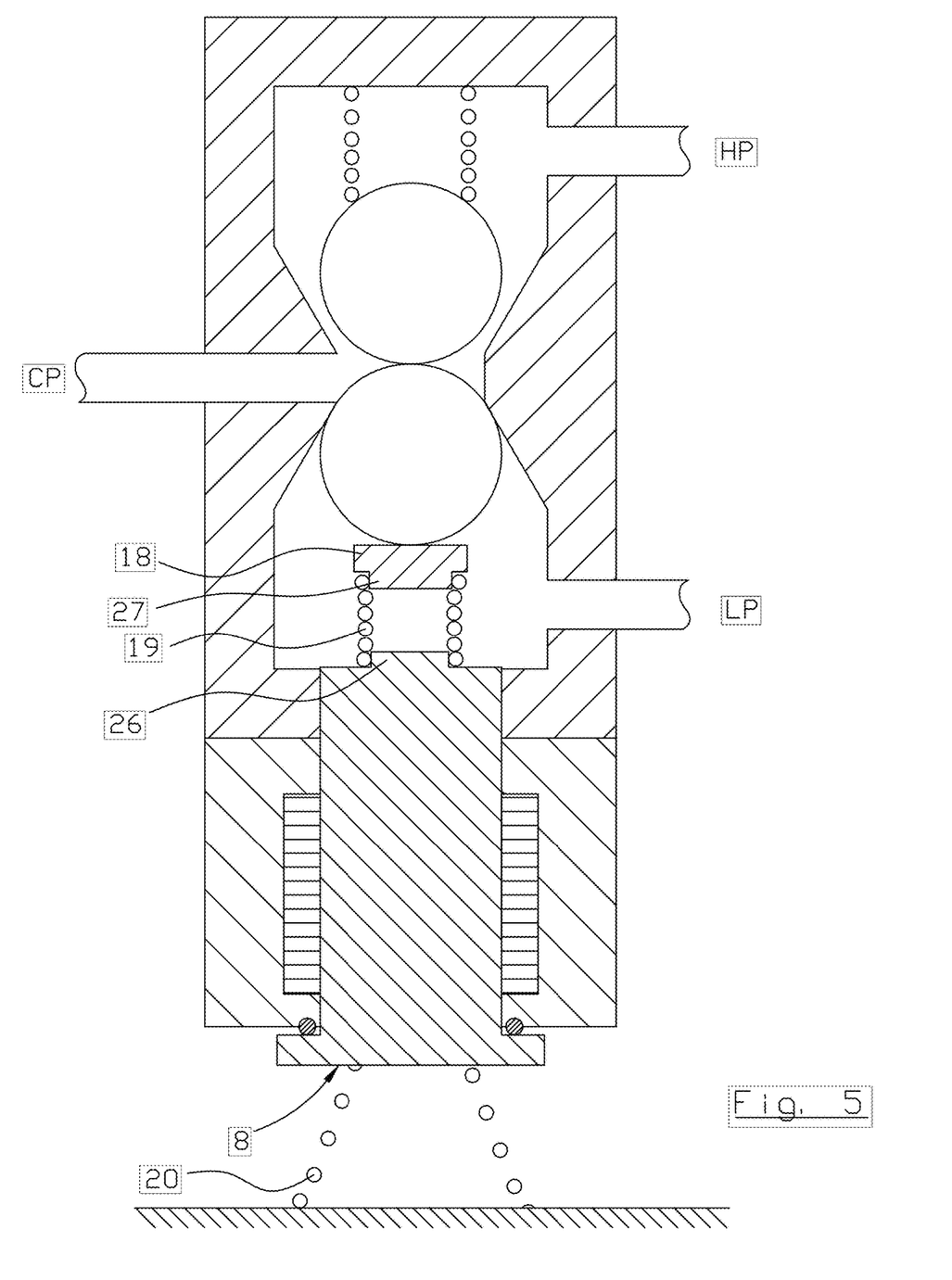
FIG. 5 is a schematic illustration of a multi-way valve according to a third embodiment, where the multi-way valve is in the active state.

According to an alternative embodiment, see FIG. 5 that discloses a third embodiment of the multi-way valve 1, the first spring member 19 is connected to the armature 8 and the drive body 18 is connected to the first spring member 19, for instance by having the outermost spring turn/turns pressed onto a pin 26 of the armature 8 and onto a pin 27 of the drive body 18, respectively.

Figure 6:
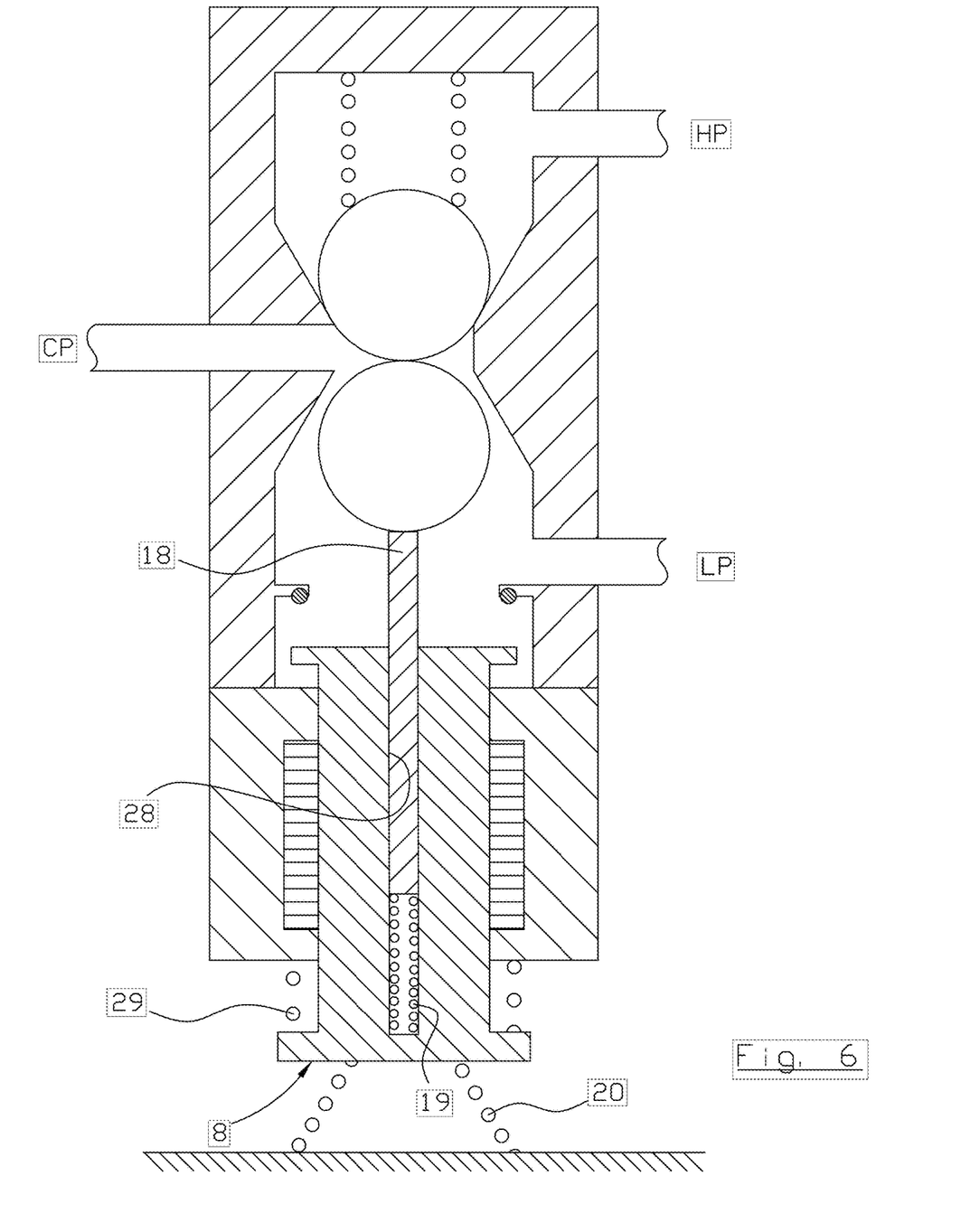
FIG. 6 is a schematic illustration of a multi-way valve according to a forth embodiment, where the multi-way valve is in the inactive state.

According to another alternative embodiment, see FIG. 6 that discloses a forth embodiment of the multi-way valve 1, the drive body 18 is constituted by a rod that is telescopically arranged in a bore 28 of the armature 8. The first spring member 19 is located at the bottom of the bore 28. Thereto, a fourth spring member 29 may bias the armature 8 in the direction towards its inactive position in order to return the armature 8 when the multi-way valve 1 is currentless/dead. The fourth spring member 29 is preferably arranged between the external brim 9b of the armature 8 and the external stop surface 10b, and when the armature 8 takes the active position the fourth spring member 29 may bottom, i.e. become fully compressed. The fourth spring member 29 may be applied to all disclosed as well as implicit embodiments. The spring force exerted by the third spring member 20 is greater than the spring force exerted by the fourth spring member 29. However, it is conceivable that when the multi-way valve 1 is oriented as shown in the figures the armature 8 takes its inactive position due to gravity.

Other equivalent solutions are conceivable as well.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equipment may be modified in all kinds of ways within the scope of the appended claims.

It shall also be pointed out that all information about/concerning terms such as above, below, upper, lower, etc., shall be understood/read with the equipment oriented in accordance with the figures, having the drawings oriented in such a way that the indexing can be read in a correct way. Thus, similar terms indicate only mutual relationships in the shown embodiments, which relationships can be changed if the equipment according to the invention is provided with another construction/design.

It shall be pointed out that even if it is not explicitly stated that a feature from a specific embodiment can be combined with the features in another embodiment, this shall be considered obvious when possible. All features have not been disclosed in all embodiments/figures nor in all feasible combinations for the sake of simplicity.

The invention claimed is:

1. A multi-way valve for serving an actuator for axial displacement of an object, the multi-way valve comprises a control pressure channel (5) and is configured to communicate an adjustable control pressure via said control pressure channel (5), the multi-way valve (1) comprising:
   a first control fluid channel (12) extending between a first opening (13) and said control pressure channel (5),
   a second control fluid channel (14) extending between a second opening (15) and said control pressure channel (5),
   a valve body arrangement (16) arranged in said first control fluid channel (12) and in said second control fluid channel (14), in order to alternately open and close the first control fluid channel (12) and the second control fluid channel (14), respectively and
   an electrically controlled device (6) having a drive member (7) and an armature (8), the armature (8) being displaceable back and forth under the effect of said drive member (7) between an inactive position and an active position,
   wherein the multi-way valve (1) is configured by means of the movement of the armature (8) from the inactive position to the active position to displace the valve body arrangement (16) from an inactive position where the first control fluid channel (12) is open and the second control fluid channel (14) is closed to an active position where the first control fluid channel (12) is closed and the second control fluid channel (14) is open, and the electrically controlled device (6) further comprising a drive body (18) connected to said armature (8) and a first spring member (19) arranged between the armature (8) and said drive body (18), wherein the valve body arrangement (16) is biased in the direction towards the inactive position by means of a second spring member (17), and wherein the armature (8) when located in the inactive position is biased in the direction towards the active position by means of a third spring member (20), the first spring member (19) exerting a greater spring force than the third spring member (20), wherein the second opening (15) is configured to be connected to a control fluid source (HP), wherein the second control fluid channel (14) is constituted by a control fluid inlet channel and the second opening (15) is constituted by a control fluid inlet, and wherein the first opening (13) is configured to be connected to a control fluid sink (LP), wherein the first control fluid channel (12) is constituted by a control fluid outlet channel and the first opening (13) is constituted by a control fluid outlet.

2. The multi-way valve according to claim 1, wherein the third spring member (20) is preloaded when the armature (8) is located in the active position.

3. The multi-way valve according to claim 2, wherein the third spring member is a conical helical spring.

4. The multi-way valve according to claim 2, wherein the second spring member exerts a greater spring force than the third spring member.

5. The multi-way valve according to claim 2, wherein the first spring member (19) exerts a greater spring force than the second spring member (17).

6. The multi-way valve according to claim 1, wherein the third spring member (20) is a conical helical spring.

7. The multi-way valve according to claim 6, wherein the second spring member exerts a greater spring force than the third spring member.

8. The multi-way valve according to claim 6, wherein the first spring member (19) exerts a greater spring force than the second spring member (17).

9. The multi-way valve according to claim 1, wherein the second spring member (17) exerts a greater spring force than the third spring member (20).

10. The multi-way valve according to claim 9, wherein the first spring member (19) exerts a greater spring force than the second spring member (17).

11. The multi-way valve according to claim 1, wherein the first spring member (19) exerts a greater spring force than the second spring member (17).

12. The multi-way valve according to claim 1, wherein an internal rubber damper (11a) is arranged at the interface between an internal brim (9a) of the armature (8) and an internal stop surface (10a) arranged in the first control fluid channel (12), wherein said internal rubber damper (11a) is compressed between the internal brim (9a) and the internal stop surface (10a) when the armature (8) is in the active position.

13. The multi-way valve according to claim 1, wherein an external rubber damper (11b) is arranged at the interface between an external brim (9b) of the armature (8) and an external stop surface (10b) of the electrically controlled device (6), wherein said external rubber damper (lib) is compressed between the external brim (9b) and the external stop surface (10b) when the armature (8) is in the active position.

14. The multi-way valve according to claim 1, wherein the armature (8) is biased in the direction towards the inactive position by means of a fourth spring member (29), the third spring member (20) exerting a greater spring force than the fourth spring member (29).

15. The multi-way valve according to claim 1, wherein the drive body (18) is arranged in said first control fluid channel (12), the drive body (18) being configured to abut the valve body arrangement (16) and the first spring member (19) being in a compressed state when the armature (8) is located in the active position.

16. The multi-way valve according to claim 1, wherein the armature (8) in the free end thereof comprises a cavity (24) housing said drive body (18) and said first spring member (19).

17. The multi-way valve according to claim 1, wherein the valve body arrangement (16) comprises a first valve body (21) arranged in said first control fluid channel (12) and a second valve body (22) arranged in said second control fluid channel (14), wherein the multi-way valve (1) is configured by means of the movement of the armature (8) from the inactive position to the active position to displace the first valve body (21) to an active position in which the first control fluid channel (12) is closed and to displace the second valve body (22) to an active position in which the second control fluid channel (14) is open.

18. The multi-way valve according to claim 1, wherein the electrically controlled device (6) is constituted by an electro magnetic device.

19. The multi-way valve according to claim 18, wherein the drive member (7) of the electro magnetic device (6) is constituted by a coil.

20. An actuator for axial displacement of an object, wherein the actuator comprises a multi-way valve (1) according to claim 1.

* * * * *